United States Patent Office 3,093,624
Patented June 11, 1963

3,093,624
COPOLYMERS OF OLEFINES CONTAINING AT LEAST THREE CARBON ATOMS
William F. Gresham, Wilmington, and Madison Hunt, Claymont, Del., assignors to E. I. du Pont de Nemours & Company, Wilmington, Del., a corporation of Delaware
No Drawing. Filed Jan. 25, 1956, Ser. No. 561,337
7 Claims. (Cl. 260—88.2)

This invention relates to copolymers of homologs of ethylene, and more particularly to such copolymers of high molecular weight having rubber-like properties.

It has recently been found that certain terminally unsaturated olefins may be polymerized to products of high molecular weight by means of catalysts characterized by the presence of compounds of titanium having less than its maximum valence of four, such catalysts being described in U.S. Patent No. 2,721,189 to Anderson and Merckling. These homopolymers, depending upon the number of carbon atoms which they contain, give products varying from tough, high-melting plastics through products having somewhat rubbery properties to compounds best characterized as waxes.

It is an object of the present invention to provide polymeric products from olefins containing at least 3 carbon atoms and having desirable elastomeric properties, particularly properties characteristic of unvulcanized natural rubber. A futher object is to product elastomeric or rubber-like polymers from a variety of monomeric olefins. A still further object is to produce polymers suitable for further chemical reactions to product desirable elastomers.

We have found that polymeric products may be obtained from mixtures of terminally unsaturated olefins containing at least 3 carbon atoms, which products have many useful properties that can be varied by varying the composition both as regards the particular olefins used as starting materials and the proportions in which they are copolymerized.

The products of the present invention are elastomeric solid copolymers of two or more (at least two) mono-olefins, each olefin containing at least three carbon atoms and having the following structure, $CH_2=CHR$, where R is a straight chain alkyl radical of from 1 to 10 carbon atoms.

It will thus be seen that one of the monoolefins to be copolymerized may be propylene, butene-1, pentene-1 and their higher homologs through dodecene, and that the second monoolefin to be copolymerized therewith may be any of those above named except that it cannot be the same as the one selected as the first copolymerizable olefin. Similarly, three component copolymers may be made according to this invention from any three straight chain monoolefins containing from 3 to 12 carbon atoms, such as a mixture of propylene, butene-1 and pentene-1, or a mixture of propylene, hexene-1 and dodecene-1, etc. The copolymers are characterized in general by having well-developed elastomeric properties. While they can be deformed permanently by sufficient stress, when moderate stress is applied they tend to return to approximately their original dimension when the stress is removed. Even the lower olefins of the above definition, such as propylene and butene-1, which by themselves give tough, non-elastic polymers similar to polyethylene, give truly elastomeric products when copolymerized with each other and with higher olefins. The present invention may therefore utilize normally-occurring mixtures which are more readily available and therefore cheaper starting materials than the individual olefins. The copolymers of the present invention are largely or completely soluble in many organic solvents, particularly aromatic hydrocarbons and highly chlorinated aliphatic or aromatic hydrocarbons, forming viscous solutions with intrinsic viscosities of at least about 2 indicating approximate molecular weights above 50,000. The high molecular weight of these polymers is confirmed by molecular weight determinations based on osmotic pressure. They are further characterized by a very high degree of saturation and a chemical inertness like that of the higher, naturally-occurring members of the paraffin hydrocarbon series. This combination of properties has not in the past been available in the generally known natural or synthetic products. The known elastomeric products are in general chemically reactive, while the strictly inert materials are unsuitable for many purposes because of their hardness and lack of elasticity.

The copolymers of the present invention may be used wherever an inert, elastomeric product is required, for example, for coating, impregnating and waterproofing fibrous materials and also for producing protective coatings on metals, etc. They may also be used as thickening agents for lubricating oils and the like, where their chemical inertness and higher viscosity make them doubly valuable. They are also well suited as starting materials for further chemical reactions, such as chlorination and sulfochlorination, leading to elastomeric products having still different properties.

These interpolymers may be prepared by the use of a catalyst, the essential constituent of which is a titanium compound in which the titanium has a valence of less than 4. Such catalysts may be conveniently made by the reaction of a lithium aluminum alkyl (readily made by heating lithium aluminum hydride with the corresponding olefin) with titanium tetrachloride in strict absence of water and oxygen, the reaction being carried out in a hydrocarbon solvent free from compounds containing reactive halogens and functional groups. Other catalysts of this type may likewise be employed. The solvents also conveniently serve as solvents for the polymerization reaction, which, for example, is usually carried out in a dilute suspension of the catalyst containing 1 mol of titanium compound per 100 to 200 liters of solution. The polymerization normally takes place at ordinary atmospheric temperatures and pressures. It is usually convenient to allow the temperature to rise spontaneously to 50° to 60° C. in the case of the lower olefins, which are usually more reactive. In the case of higher olefins, it is sometimes desirable to apply heat to the polymerizing system. Ordinarily polymerization at a satisfactory rate will take place at temperatures below 100° C. The rate of the reaction may be increased by the use of increased pressures, for instance, up to 1000 atmospheres or above, or temperatures up to 300° C., although it is to be understood that elevated temperatures and pressures are not required. When found desirable, the polymerization may be carried out at lower temperatures and pressures. The monomers may be added simultaneously to the catalyst suspension over a period of several hours, or the less reactive monomer may be added at the start and the second more reactive one added gradually or, in the case where both monomers are rather unreactive, both may be present together in full amount from the start. When one monomer reacts considerably more slowly than the other, it is advantageous to add all of it at the start or early in the reaction as described above. In such a situation the less readily polymerizable monomer may not react entirely during the time available for the reaction, and accordingly the less readily polymerizable monomer should be present in the starting material in a larger proportion than desired in the final interpolymer.

In producing the elastomers of this invention the copolymer should contain at least 5% of a second monoolefin of the class described. It is preferred that the ratio of one olefin to the other in the copolymer be from 1:3 to 3:1, or, in general, that each component be present in an amount at least 25% of the copolymer. The reaction mass should be agitated during the polymerization, particularly if one or more of the olefins are being added as a gas. The reaction mass becomes viscous as the reaction proceeds and more polymer is formed. It is sometimes desirable to dilute the reaction mass further with the solvent during the course of the reaction, in order to reduce its viscosity. The reaction mass is conveniently worked up by pouring the solution into methanol with stirring. The methanol may contain hydrogen chloride to assist in the removal of the inorganic constituents from the polymer. The polymer precipitates as a rubbery mass and the inorganic materials from the catalyst and unpolymerized monomers remain largely in the methanol hydrocarbon mixture. The polymer may be washed with several proportions of methanol and then dried either by moderate heating under reduce pressure or by milling on a heated rubber mill.

The following examples are given to more fully illustrate the invention.

*Example 1*

The catalyst suspension was prepared by heating 2.29 g. (0.06 mol) of lithium aluminum hydride and 43 g. (0.3 mol) of decene-1 for three hours at approximately 140° C. The reaction mass containing lithium aluminum tetradecyl formed a gray slurry. This was cooled to 10° C., diluted with thiophene-free benzene, and treated with 3.8 g. (0.02 mol) of titanium tetrachloride, forming a black suspension of the catalyst. This was further diluted with 1750 ml. of thiophene-free benzene. The introduction of equimolecular mixture of propylene and butene-1 was started with stirring at such a rate that the gas was completely absorbed in the reaction mass. This was continued, allowing the reaction mass to warm somewhat above room temperature due to the heat of the reaction, until it became too viscous for efficient agitation. The polymer was then precipitated by pouring the viscous solution into methanol. The precipitate was washed again with methanol and then dried by milling on a warm rubber mill, giving 106 g. of a light-colored elastic rubbery material forming a smooth band on the mill. It was almost completely soluble in benzene, xylene and carbon tetrachloride, and had an intrinsic viscosity of 2.63 in benzene.

*Example 2*

This example illustrates a use of the copolymers of the present invention in making vulcanizable chlorosulfonated products.

The product of Example 1 was dissolved in carbon tetrachloride in the proportion of 30 g. per 1200 ml. of carbon tetrachloride, and was heated to reflux and treated with a stream of chlorine after the addition of 0.06 g. of the azo polymerization initiator, alpha,alpha-azo-diisobutyronitrile used here as a chlorination catalyst. When the reaction started, as evidenced by copious HCl evolution, the heating of the flask was stopped and the chlorine feed was increased to 4.6 gm./hr. The flask was allowed to cool slowly to 52° C. during the first hour of chlorine addition. Chlorine was added at the above rate for 100 minutes. At the end of this time, $SO_2$ addition was started at 11.8 gm./hr. along with chlorine as before, and this chlorosulfonation was continued at 52° C. for 12 minutes. The solution was then refluxed for one-half to one hour, cooled to 60° C., and stabilized by the addition with stirring of 0.1 g. of the condensation product of 2 mols of epichlorhydrin with 1 mol of propane-2,2-bis-phenol. The polymer was isolated by drum drying, using a double-roll steam-heated drier, with each roll 8 inches wide and 6 inches in diameter with the carbon tetrachloride solution introduced between the rolls and the dried film of chlorosulfonated polymer removed from the rolls by doctor knives. Using steam at about 30 pounds pressure (135° C.) and two revolutions per minute, the above charge was introduced over a period of about 18 minutes. The thin, continuous, self-supporting dried films removed by the doctor knives were wound up on reels, forming compact, laminated masses for testing. The dried films may also be laterally compressed into a continuous, compact rope. Analyses showed 11.7% chlorine and 1.12% sulfur. This rubbery chlorosulfonated product when compounded with 40 parts of weight of litharge, 30 parts of carbon black, 2.5 parts of hydrogenated rosin and 0.5 part of a mixture of pentamethylene thiuram tetrasulfide and mercaptobenzothiazole per 100 parts of the elastomer, was cured for 30 minutes at 160° C. The vulcanizate has tensile strength of 3050 lbs./sq. in. and an elongation at break of 260%.

A number of other copolymers were prepared by the general method given above, using equimolecular weights of other olefins. Their properties are given in the following table, the properties of the product as in the above Example 1 being included for comparison. All were clear, light-colored, rubber-like materials, varying among each other in plasticity (softness) and elasticity (nerve).

| Ex. No. | Monomers | Qualitative properties | Intrinsic viscosity | Mol weight (osmotic) |
| --- | --- | --- | --- | --- |
| 1 | Propylene:butene-1 | Easily milled | 2.63 | |
| 3 | Propylene:hexene-1 | More nerve than 1 | 4.54 | 61,000 |
| 4 | Butene-1:hexene-1 | Like 1 | 5.10 | 65,000 |
| 5 | Butene-1:dodecene-1 | Softer than 1 | 2.00 | |
| 6 | Pentene-1:hexene-1 | Softer than 5 | 2.22 | 74,000 |

We claim:

1. Copolymer elastomers of at least two terminally unsaturated straight chain monoolefins each containing from 3 to 12 carbon atoms, the second olefin being present in an amount at least 5% of the total copolymer, said copolymer having an intrinsic viscosity of at least about 2, and being prepared by the use of a catalyst the essential constituent of which is a titanium compound in which the titanium has a valence of less than 4 and which catalyst is prepared by the reaction of a lithium aluminum alkyl with titanium tetrachloride in a hydrocarbon solvent and in the absence of water and oxygen.

2. Copolymer elastomers of at least two terminally unsaturated straight chain monoolefins each containing from 3 to 12 carbon atoms, each monoolefin component being present in the polymer in an amount at least 25% of the copolymer, and said copolymer having an intrinsic viscosity of about 2, and being prepared by the use of a catalyst the essential constituent of which is a titanium compound in which the titanium has a valence of less than 4 and which catalyst is prepared by the reaction of a lithium aluminum alkyl with titanium tetrachloride in a hydrocarbon solvent and in the absence of water and oxygen.

3. A copolymer elastomer of substantially equal parts of propylene and butene-1, said copolymer having an intrinsic viscosity of at least about 2, and being prepared by the use of a catalyst the essential constituent of which is a titanium compound in which the titanium has a valence of less than 4 and which catalyst is prepared by the reaction of a lithium aluminum alkyl with titanium tetrachloride in a hydrocarbon solvent and in the absence of water and oxygen.

4. A copolymer elastomer of substantially equal parts of propylene and hexene-1, said copolymer having an intrinsic viscosity of at least about 2, and being prepared by the use of a catalyst the essential constituent of which is a titanium compound in which the titanium has a valence of less than 4 and which catalyst is prepared by the reaction of a lithium aluminum alkyl with titanium tetrachloride in a hydrocarbon solvent and in the absence of water and oxygen.

5. A copolymer elastomer of substantially equal parts of butene-1 and hexene-1, said copolymer having an intrinsic viscosity of at least about 2, and being prepared by the use of a catalyst the essential constituent of which is a titanium compound in which the titanium has a valence of less than 4 and which catalyst is prepared by the reaction of a lithium aluminum alkyl with titanium tetrachloride in a hydrocarbon solvent and in the absence of water and oxygen.

6. A copolymer elastomer of substantially equal parts of butene-1 and dodecene-1, said copolymer having an intrinsic viscosity of at least about 2, and being prepared by the use of a catalyst the essential constituent of which is a titanium compound in which the titanium has a valence of less than 4 and which catalyst is prepared by the reaction of a lithium aluminum alkyl with titanium tetrachloride in a hydrocarbon solvent and in the absence of water and oxygen.

7. A copolymer elastomer of substantially equal parts of pentene-1 and hexene-1, said copolymer having an intrinsic viscosity of at least about 2, and being prepared by the use of a catalyst the essential constituent of which is a titanium compound in which the titanium has a valence of less than 4 and which catalyst is prepared by the reaction of a lithium aluminum alkyl with titanium tetrachloride in a hydrocarbon solvent and in the absence of water and oxygen.

References Cited in the file of this patent

UNITED STATES PATENTS

| | | |
|---|---|---|
| 2,182,617 | Michel | Dec. 5, 1939 |
| 2,825,721 | Hogan et al. | Mar. 4, 1958 |
| 2,862,917 | Anderson et al. | Dec. 2, 1958 |

FOREIGN PATENTS

| | | |
|---|---|---|
| 538,782 | Belgium | Dec. 6, 1955 |